(12) United States Patent
Pennington et al.

(10) Patent No.: US 8,199,118 B2
(45) Date of Patent: Jun. 12, 2012

(54) TOUCHSCREEN USING BOTH CARBON NANOPARTICLES AND METAL NANOPARTICLES

(75) Inventors: Brian D. Pennington, San Jose, CA (US); Joel C. Kent, Fremont, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 954 days.

(21) Appl. No.: 11/891,980

(22) Filed: Aug. 14, 2007

(65) Prior Publication Data
US 2009/0046073 A1    Feb. 19, 2009

(51) Int. Cl.
*G06F 3/041* (2006.01)
(52) U.S. Cl. .................... 345/173; 428/297.4
(58) Field of Classification Search ........... 345/174, 345/173; 428/297.4, 1.4, 229.1, 411.1; 977/734
See application file for complete search history.

(56) References Cited

U.S. PATENT DOCUMENTS

| 4,353,552 | A | 10/1982 | Pepper, Jr. |
| 5,738,934 | A | 4/1998 | Jones |
| 6,469,267 | B1 | 10/2002 | Welsh et al. |
| 6,593,916 | B1 | 7/2003 | Aroyan |
| 6,650,319 | B1 | 11/2003 | Hurst et al. |
| 7,106,307 | B2 | 9/2006 | Cok |
| 7,180,508 | B2 | 2/2007 | Kent et al. |
| 7,477,242 | B2 | 1/2009 | Cross et al. |
| 7,956,287 | B2 | 6/2011 | Takayama et al. |
| 2003/0001826 | A1 | 1/2003 | Richter et al. |
| 2004/0265550 | A1 | 12/2004 | Glatkowski et al. |
| 2005/0209392 | A1 | 9/2005 | Luo et al. |
| 2005/0266162 | A1 | 12/2005 | Luo et al. |
| 2005/0267264 | A1 | 12/2005 | Takei et al. |
| 2006/0274048 | A1 | 12/2006 | Spath et al. |
| 2006/0274049 | A1 | 12/2006 | Spath et al. |
| 2007/0074316 | A1 | 3/2007 | Alden et al. |
| 2007/0128905 | A1* | 6/2007 | Speakman ............... 439/161 |
| 2008/0029292 | A1 | 2/2008 | Takayama et al. |
| 2008/0123078 | A1* | 5/2008 | Saraf ............... 977/956 |
| 2009/0046078 | A1 | 2/2009 | Kent |

FOREIGN PATENT DOCUMENTS

| CN | 1653414 A | 8/2005 |
| CN | 1947203 A | 4/2007 |
| EP | 1739692 A | 1/2007 |
| WO | WO2007/022226 A2 | 2/2007 |
| WO | WO-2008/057615 A | 5/2008 |

OTHER PUBLICATIONS

International Search Report for International Application No. PCT/US2008/009718, mailed Jun. 24, 2009.
International Search Report for International Application No. PCT/US2008/009717.
Yang, Y.; Huang, S.; He, H.; Mau, A.W. H.; Dai, L. J. Am. Chem. Soc. 1999, 121, 10832-10833.
Jana, N.; Gearheart, L.; Murphy, C.; Chem. Commun., 2001, 617-618.
Dai, L.; Patil, A.; Gong, X.; Guo, Z.; Liu, L.; Liu, Y.; Zhu, D. Chem. Phys. Chem. 2003, 4, 1150-1169.
Communication of Oct. 12, 2011 from EPO for EP 08827391.7.

\* cited by examiner

*Primary Examiner* — Kevin M Nguyen

(57) ABSTRACT

A cover sheet assembly is provided for a touchscreen system. The cover sheet assembly includes an insulating layer having a surface configured to be disposed over an electrically conductive area of a substrate of the touchscreen system, and an electrically conductive material disposed on at least a portion of the surface of the insulating layer. The electrically conductive material includes a plurality of carbon nanoparticles and a plurality of metal nanoparticles.

20 Claims, 6 Drawing Sheets

TOUCHSCREEN USING BOTH CARBON NANOPARTICLES AND METAL NANOPARTICLES

BACKGROUND OF THE INVENTION

The invention relates generally to computer touchscreens, and more particularly, to electrically conductive materials for touchscreens.

Since their introduction in the early 1970s, touchscreens have afforded alternatives to keyboards for certain computer applications. In many situations the keyboard and mouse are eliminated, because the touchscreen provides the user with access to the computer. Both resistive and capacitive touchscreens typically include a substrate, such as a glass panel, that is positioned over the face of a display, for example a liquid crystal display (LCD). The substrate includes an electrically conductive material on a surface thereof. The electrically conductive material defines an electrically conductive touch area on the substrate surface for accepting a user's inputs to the touchscreen. An insulating layer is positioned over the electrically conductive area to provide a surface for the user to touch to select the inputs.

In a resistive touchscreen, the insulating layer forms a portion of a cover sheet that includes a second electrically conductive material located over a surface of the insulating layer facing the substrate. The cover sheet is spaced from the substrate by a plurality of insulating dots such that the two electrically conductive materials are spaced apart. When the cover sheet is touched by a user, the two electrically conductive materials engage each other at the location of the user's touch. In capacitive touchscreens, the insulating layer is deposited directly on the electrically conductive material on the substrate.

The electrically conductive materials on both the substrate and the insulating layer are typically formed from indium tin oxide (ITO). ITO is often used because ITO generally provides good transparency for a given value of electrical conductivity, as is desired for some touchscreen applications. However, ITO may be somewhat brittle such that the electrically conductive material may crack, fracture, and/or fatigue after repeated touches, which may cause the touchscreen to malfunction, fail, and/or function differently than intended. Moreover, because the supply of indium is limited, ITO may be relatively expensive. Increasing demand for indium may cause ITO to become even more expensive as the world supply diminishes.

To replace ITO, metal nanofibers have been proposed for use in the electrically conductive material that is present on the substrate and/or on the cover sheets of touchscreens. However, metal nanofibers may be prone to atmospheric corrosion. Atmospheric corrosion of metal nanofibers within the electrically conductive material may increase a contact resistance of the electrically conductive material, which may decrease the flow of electrical current into and out of the electrically conductive material at the point of contact between the electrically conductive material with another electrically conductive material. Carbon nanotubes have also been proposed as a replacement for ITO in the electrically conductive material that is present on the substrate and/or on the cover sheets of touchscreens. However, carbon nanotubes may not match the transparency of ITO for a given electrical conductivity.

There is a need for an electrically conductive material that has an increased durability as compared with electrically conductive materials formed from ITO. There is also a need to improve the corrosion resistance of electrically conductive materials that include metal nanoparticles. Moreover, there is a need to improve the transparency of electrically conductive materials that include carbon nanoparticles.

BRIEF DESCRIPTION OF THE INVENTION

In one embodiment, a cover sheet assembly is provided for a touchscreen system. The cover sheet assembly includes an insulating layer having a surface configured to be disposed over an electrically conductive area of a substrate of the touchscreen system, and an electrically conductive material disposed on at least a portion of the surface of the insulating layer. The electrically conductive material includes a plurality of carbon nanoparticles and a plurality of metal nanoparticles.

In another embodiment, a substrate assembly is provided for a touchscreen system. The substrate assembly includes a substrate and an electrically conductive material disposed on at least a portion of a surface of the substrate to provide an electrically conductive touch area on the substrate. The electrically conductive material includes a plurality of carbon nanoparticles and a plurality of metal nanoparticles.

In another embodiment, an electrically conductive material is provided that includes a plurality of carbon nanotubes and a plurality of metal nanofibers.

DETAILED DESCRIPTION OF THE INVENTION

As used herein, a material is considered to be electrically conductive if there exists two points on the material that can be measured as having a resistance therebetween that is less than about ten MegaOhms. In the context of resistive touchscreen systems, a distinction is made between resistance to electrical conductivity in the forms of "sheet resistance" and "contact resistance". As used herein, the "sheet resistance" of an electrically conductive material is defined as the resistance to the flow of electrical currents within a plane of the electrically conductive material. As used herein, the "contact resistance" of an electrically conductive material is defined as the resistance to the flow of electrical current into and out of the electrically conductive material at the point of contact between the electrically conductive material with another electrically conductive material.

Figure 1:
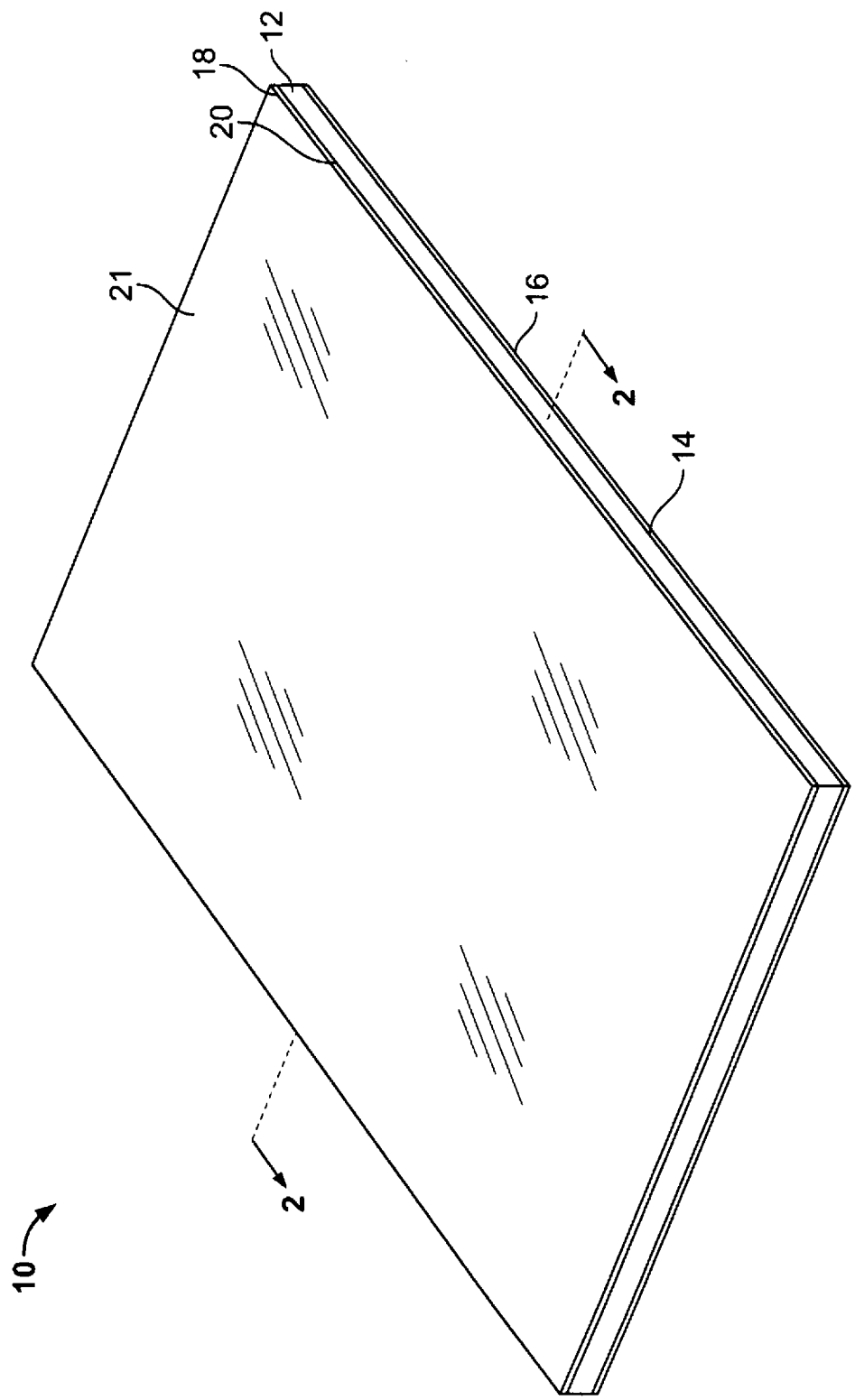
FIG. 1 is a perspective view of a touchscreen cover sheet assembly formed in accordance with an embodiment of the present invention.
Figure 2:
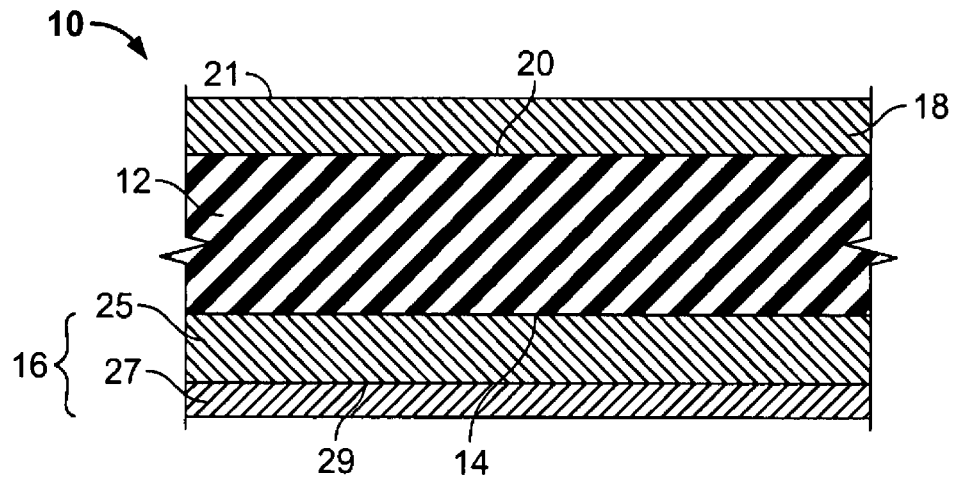
FIG. 2 is a cross-sectional view of the touchscreen cover sheet assembly shown in FIG. 1 taken along line 2-2 of FIG. 1.
Figure 4:
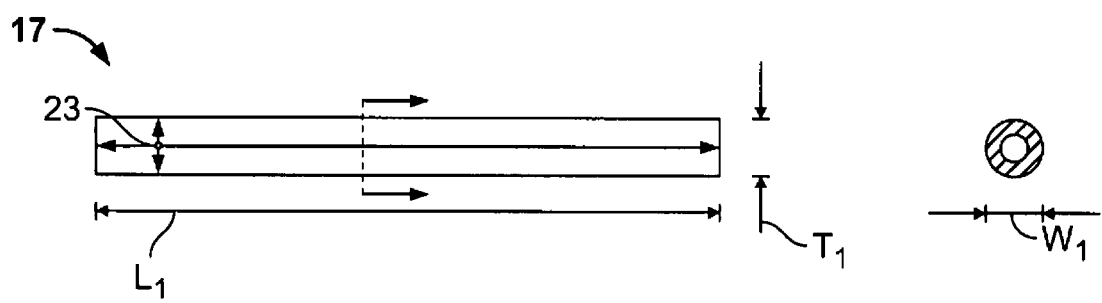
FIG. 4 is a schematic illustration of a carbon nanoparticle of the touchscreen cover sheet assembly shown in FIGS. 1 and 2.
Figure 5:
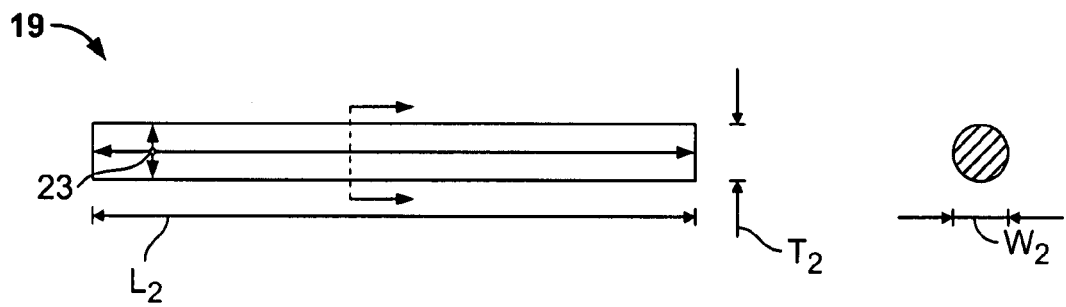
FIG. 5 is a schematic illustration of a metal nanoparticle of the touchscreen cover sheet assembly shown in FIGS. 1 and 2.

FIG. 1 is a perspective view of a touchscreen cover sheet assembly 10 formed in accordance with an embodiment of the present invention. FIG. 2 is a cross-sectional view of the touchscreen cover sheet assembly 10. The assembly 10 may be used with resistive touchscreen systems (not shown in FIGS. 1 and 2). Exemplary touchscreen systems incorporating the assembly 10 will be described in more detail below. The assembly 10 includes an insulating layer 12 having a surface 14 at least partially coated with an electrically conductive material 16. As will be described in more detail below, the electrically conductive material 16 includes both a plurality of carbon nanoparticles 17 (FIGS. 4 and 6) and a plurality of metal nanoparticles 19 (FIG. 5). The insulating layer 12 may optionally include a coating 18 on a surface 20 that is opposite the surface 14 to facilitate increasing the durability of the cover sheet assembly 10 generally and/or the surface 20 specifically. The coating 18 may be fabricated from any suitable material(s), such as, but not limited to, an acrylic resin and/or glass.

When in use, and as described below in more detail with respect to FIG. 10, the assembly 10 is held over a substrate (not shown in FIGS. 1 and 2) of a touchscreen system such that the surface 14 and the electrically conductive material 16 thereon generally face the substrate. A surface 21 of the coating 18, or alternatively the surface 20 when the coating 18 is not included, provides an exposed touch surface that a user may touch to select an input displayed by the touchscreen system.

The insulating layer 12 may be fabricated from any suitable material(s) that enables the insulating layer 12 to function as described herein, such as, but not limited to, polyester, polyethylene terephthalate (PET), polyethylene naphthalate (PEN), and/or glass. Depending, for example, on the particular application(s) of the assembly 10 and/or the type of touchscreen system(s) the assembly 10 is used with, the insulating layer 12 may be completely transparent or partially transparent. In some embodiments, one or more portions of the insulating layer 12 may be opaque. The insulating layer 12 may have any suitable size and/or shape, such as, but not limited to, rectangular, circular, triangular, and/or oval-shaped, that enables the insulating layer 12 to function as described herein, for example, depending on the particular application (s) of the assembly 10 and/or the type and/or configuration of touchscreen system(s) the assembly 10 is used with.

As described above, the electrically conductive material 16 includes both carbon nanoparticles 17 and metal nanoparticles 19. In the exemplary embodiment of FIG. 2, the electrically conductive material 16 includes two layers 25 and 27. As shown in FIG. 2, the layer 25 is disposed directly on the surface 14 of the insulating layer 12 and includes the metal nanoparticles 19, while the layer 27 is disposed directly on a surface 29 of the layer 25 and includes the carbon nanoparticles 17. The layer 27 that includes carbon nanoparticles 17 facilitates preventing exposure of the metal nanoparticles 19 of the layer 25 to the atmosphere and thereby facilitates protecting the metal nanoparticles 19 of the layer 25 from atmospheric corrosion. Accordingly, the layer 27 facilitates preventing an increase in the contact resistance of the electrically conductive material 16. Moreover, the electrically conductive material 16 may have an increased durability as compared with an electrically conductive material formed from indium tin oxide (ITO) because of the elasticity of the metal nanoparticles 19 and/or the impact resistance of the carbon nanoparticles 17. Although two layers 25 and 27 are shown, the electrically conductive material 16 may include any number of layers, each of which may include either the carbon nanoparticles 17 or the metal nanoparticles 19 as long as the outermost exposed layer includes the carbon nanoparticles 17.

Figure 3:
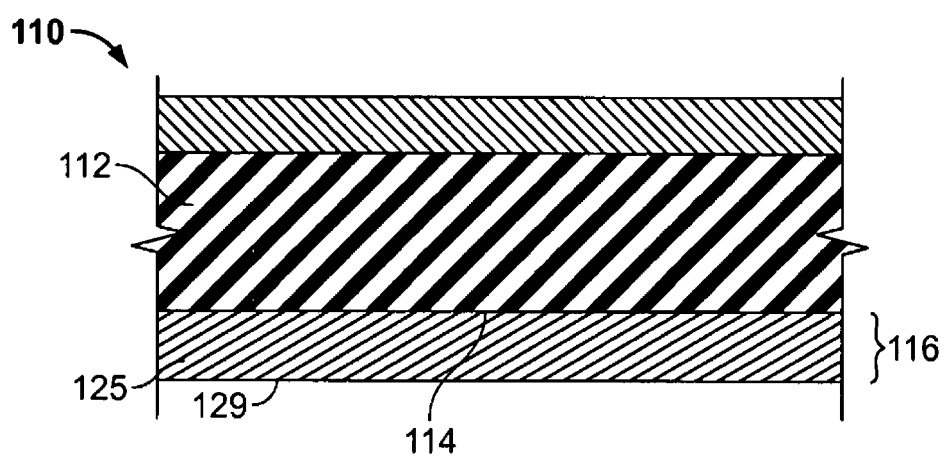
FIG. 3 is a cross-sectional view of a touchscreen cover sheet assembly formed in accordance with an alternative embodiment of the present invention.

In an alternative embodiment, the electrically conductive material 16 includes one or more layers that each has a mixture of the carbon nanoparticles 17 and the metal nanoparticles 19. As used herein, the term "mixture" includes a layer that includes one or more discrete areas that each only includes carbon nanoparticles or metal nanoparticles, a layer that includes carbon and metal nanoparticles mixed throughout (whether or not the mixture is homogeneous), and/or a combination thereof. FIG. 3 is a cross-sectional view of a touchscreen cover sheet assembly 110 formed in accordance with an alternative embodiment of the present invention. The assembly 110 includes an insulating layer 112 having a surface 114 at least partially coated with an electrically conductive material 116. The electrically conductive material 116 includes only a single layer 125. The single layer 125 includes a mixture of carbon nanoparticles (not shown in FIG. 3) and metal nanoparticles (not shown in FIG. 3). Optionally, the electrically conductive material 116 may include more than one layer 125 that includes a mixture of the carbon nanoparticles and the metal nanoparticles. In the exemplary embodiment of FIG. 3, the carbon nanoparticles and the metal nanoparticles are each randomly oriented within the layer 125. However, the carbon nanoparticles and/or the metal nanoparticles may optionally be non-randomly oriented within the layer 125, for example as is described below in more detail with respect to the electrically conductive material 16 (FIGS. 1 and 2). In the exemplary embodiment of FIG. 3, at least partially exposed metal nanoparticles on a surface 129 of the layer 125 of the electrically conductive material 116 may experience some atmospheric corrosion. However, carbon nanoparticles within the layer 125 that are also at least partially exposed on the surface 129 may provide electrical conductivity at the surface 129 and thereby facilitate preventing an increase in the contact resistance of the electrically conductive material 116.

The embodiment of FIG. 2 includes an electrically conductive material 16 that includes at least two layers 25 and 27, wherein each layer 25 or 27 includes either carbon nanoparticles 17 or metal nanoparticles 19, while the embodiment of FIG. 3 includes an electrically conductive material 116 having one or more layers that each include a mixture of carbon nanoparticles and metal nanoparticles. However, the electrically conductive materials described and/or illustrated herein may optionally be a combination of the embodiments of FIGS. 2 and 3. Specifically, the electrically conductive materials described and/or illustrated herein may optionally include one or more layers that have a mixture of carbon nanoparticles and metal nanoparticles in addition to one or more layers that include either carbon nanoparticles or metal nanoparticles.

As shown in FIGS. 1 and 2, the carbon nanoparticles 17 (FIGS. 4 and 6) within the layer 27 and/or the metal nanoparticles 19 (FIG. 5) within the layer 25 may optionally be arranged such that the layer 25, the layer 27, and/or the electrically conductive material 16 overall has a predetermined transparency relative to a display (not shown) with which the assembly 10 is used. The electrically conductive material embodiments described and illustrated herein may be incorporated into touchscreen systems that are used with any type of display (not shown), such as, but not limited to, plasma displays, cathode ray tube (CRT) displays, organic light emitting diode displays (OLEDs), liquid crystal displays (LCDs), and/or any other type of display suitable for use with touchscreen systems. Some displays used with touchscreen systems emit polarized light. For example, it is well known that some LCDs emit light that is polarized. More particularly, LCDs typically include a backlight, a polarizing film between the backlight and liquid crystal material, and a second polarizing film on the opposite side of the liquid crystal material. Each display pixel of the LCD functions as an electrically controlled light valve as a result of the effects of the liquid crystal on the orientation of the polarization of the light reaching the second polarizing film. Light exiting the second polarizing film is linearly polarized. Depending on the orientation of the polarizing axis of the second polarizing film, light emitted by the LCD may be horizontally polarized, vertically polarized, polarized at a 45° angle, or polarized at any other orientation. Horizontally polarized light is light for which the associated electric field oscillates in a horizontal direction. Vertically polarized light is light for which the associated electric field oscillates in a vertical direction. Light polarized at a 45° angle is light for which the associated electric field oscillates in a direction angled 45° with respect to both the horizontal and the vertical.

The bodies of each of the carbon nanoparticles 17 within the layer 27 and the bodies of each of the metal nanoparticles 19 within the layer 25 provide a linear path within the electrically conductive material 16 that electrons move along. (As used herein, "electron" is shorthand for "a charge carrier that is either an electron or the semi-conductor concept of a 'hole'"). As shown in FIG. 4, some or all of the carbon nanoparticles 17 may optionally be elongate, such that the carbon nanoparticles 17 each have a length $L_1$ that is substantially greater than their thickness $T_1$ and their width $W_1$. For example, the carbon nanoparticles 17 may have a length $L_1$ that is 3 or more times their thickness $T_1$ and/or their width $W_1$. Optionally, the length $L_1$ may be ten or more times the thickness $T_1$ and/or the width $W_1$. The elongate shape of the carbon nanoparticles 17 provides the carbon nanoparticles 17 with anisotropic electrical conductive properties. Although shown as having a generally circular cross section, such that the thickness $T_1$ and the width $W_1$ are the same, the carbon nanoparticles 17 may each include any suitable cross-sectional shape. Similarly, as shown in FIG. 5, some or all of the metal nanoparticles 19 may optionally be elongate, such that the metal nanoparticles 19 each have a length $L_2$ that is substantially greater than their thickness $T_2$ and their width $W_2$. For example, the metal nanoparticles 19 may have a length $L_2$ that is 3 or more times their thickness $T_2$ and/or their width $W_2$. Optionally, the length $L_2$ may be ten or more times the thickness $T_2$ and/or the width $W_2$. The elongate shape of the metal nanoparticles 19 provides the metal nanoparticles 19 with anisotropic electrical conductive properties. Although shown as having a generally circular cross section, such that the thickness $T_2$ and the width $W_2$ are the same, the metal nanoparticles 19 may each include any suitable cross-sectional shape. In the exemplary embodiments, the thickness T and width W dimensions of the carbon nanoparticles 17 and the metal nanoparticles 19 are equal to or less than a micron, while the lengths L of the carbon nanoparticles 17 and the metal nanofibers 19 are greater than one micron. However, in some embodiments the thickness T and/or width W dimensions of the carbon nanoparticles 17 and/or the metal nanofibers 19 may be greater than one micron. Moreover, the length L of the carbon nanoparticles 17 and/or the metal nanofibers 19 may be less than one micron. As used herein, the prefix "nano" in "carbon nanoparticle 17" and in "metal nanoparticle 19" may refer to dimensions of less than or equal to one micron as well as dimensions of greater than one micron.

As described above, the carbon nanoparticles 17 within the layer 27 and/or the metal nanoparticles 19 within the layer 25 may optionally be oriented relative to the polarization of the light emitted by the display to provide the layer 25, the layer 27, and/or the electrically conductive material 16 overall with a predetermined transparency relative to the polarized light emitted by the display. In some embodiments, it may be desired that not all portions of the layer 25, the layer 27, and/or the electrically conductive material 16 overall have the predetermined transparency such that the carbon nanoparticles 17 and/or the metal nanoparticles 19 at such portion(s) are not oriented to provide the predetermined transparency. The predetermined transparency may be partially transparent or completely transparent to polarized light emitted by the display. For example, the lengths $L_1$ and $L_2$ of the carbon nanoparticles 17 and/or the metal nanoparticles 19, respectively, may be arranged in respective patterns that are oriented with respect to a direction $D_1$ of the electric field of the light emitted by the display such that the layer 25, the layer 27, and/or the electrically conductive material 16 overall is more transparent to the polarization of light emitted by the display than to another polarization of light that is polarized in a direction that is perpendicular to the polarization direction $D_1$ of light emitted by the display. For example, the pattern(s) of the carbon nanoparticles 17 and/or the metal nanoparticles 19 may be oriented in an alignment direction $D_A$ that is more aligned with the polarization direction of the other, non-display, polarization of light that is perpendicular to the polarization direction $D_1$ of light emitted by the display. In some embodiments, the pattern(s) of the carbon nanoparticles 17 and/or the metal nanoparticles 19 is oriented such that the layer 25, the layer 27, and/or the electrically conductive material 16 overall is at least 1% more transparent to the light emitted by the display than to the light that is polarized perpendicular to the polarization of the light emitted by the display. In other embodiments, the pattern(s) of the carbon nanoparticles 17 and/or the metal nanoparticles 19 is oriented such that the layer 25, the layer 27, and/or the electrically conductive material 16 overall is at least 2% more transparent to the light emitted by the display than to the light that is polarized perpendicular to the polarization of the light emitted by the display. In still other embodiments, the pattern(s) of the carbon nanoparticles 17 and/or the metal nanoparticles 19 is oriented such that the layer 25, the layer 27, and/or the electrically conductive material 16 overall is at least 5% more transparent to the light emitted by the display than to the light that is polarized perpendicular to the polarization of the light emitted by the display.

Figure 6:
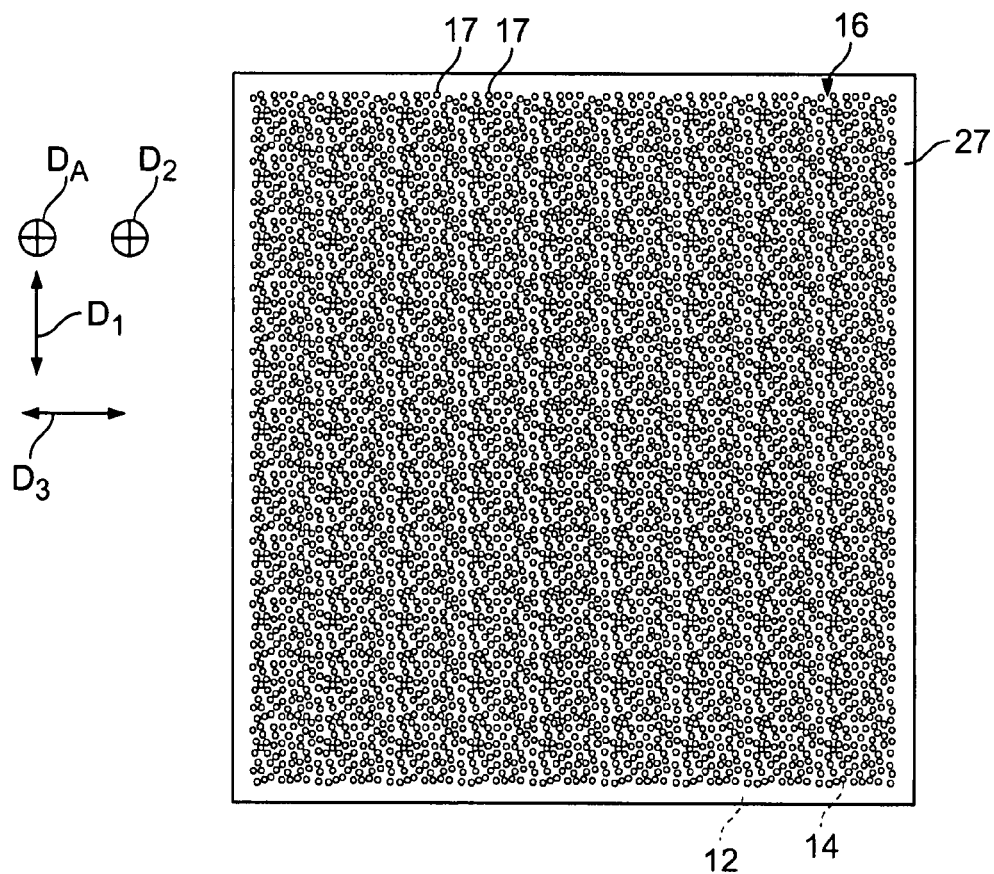
FIG. 6 is a schematic diagram of the touchscreen cover sheet assembly shown in FIGS. 1 and 2.

FIG. 6 is a schematic diagram of the cover sheet assembly 10 illustrating the plurality of carbon nanoparticles 17 being arranged in a pattern that is oriented with respect to the direction $D_1$ of the electric field of the light emitted by the display to provide a predetermined transparency to the light emitted by the display. For clarity, the size of the carbon nanoparticles 17 is exaggerated and the number of carbon nanoparticles 17 is reduced such that a density of the pattern of the carbon nanoparticles 17 is also reduced. In the exemplary embodiment of FIG. 6, the metal nanoparticles 19 are each randomly oriented within the layer 25. The alignment direction $D_A$ in which a pattern of the carbon nanoparticles 17 is oriented is approximately aligned with a direction $D_2$ that is perpendicular to the polarization direction $D_1$ of light emitted by the display. In other words, the alignment direction $D_A$ is aligned approximately perpendicular to the polarization direction $D_1$ of light emitted by the display. In the exemplary embodiment of FIG. 6, the polarization direction $D_1$ of light emitted by the display is approximately vertical, while the alignment direction $D_A$ and the direction $D_2$ extend approximately perpendicular to the surface 14 of the insulating layer 12. The electric field of the polarized light emitted by the display will excite electrons to move within the carbon nanoparticles 17 along their thickness $T_1$ (along the direction $D_1$). The thickness $T_1$ of the carbon nanoparticles 17 is substantially smaller than their length $L_1$. The electrons excited by the electric field will not move as far as if they were excited to move along the length $L_1$ of the carbon nanoparticles 17. Movement of an exemplary electron 23 along the thickness $T_1$ of a carbon nanoparticle 17 is illustrated in FIG. 4. Accordingly, the carbon nanoparticles 17 will interact less with, and therefore scatter or absorb less of, the polarized light emitted by the display than would have been the case if the carbon nanoparticles 17 had been randomly oriented. In the exemplary embodiment of FIG. 6, the alignment direction $D_A$ in which the pattern of the carbon nanoparticles 17 is oriented is approximately perpendicular to both of the polarization directions $D_1$ and $D_3$, and therefore the predetermined transparency is provided to light polarized in both the directions $D_1$ and $D_3$. For a display that emits light that is unpolarized, the transverse wave nature of light still limits polarization components to the $D_1$ and $D_3$ directions, both of which are perpendicular to the direction $D_A$ and therefore the same transparency benefits to displays emitting light that is unpolarized are provided by the embodiment of FIG. 6. Although in the exemplary embodiment of FIG. 6 the alignment direction $D_A$ is approximately perpendicular to both of the polarization directions $D_1$ and $D_3$, it is noted that with regard to a display that emits light polarized in the direction $D_1$ the predetermined transparency to the light emitted by the display (polarized in the direction $D_1$) can also be provided if the alignment direction $D_A$ in which the pattern of the carbon nanoparticles 17 is oriented is approximately aligned with the polarization direction $D_3$ instead of the direction $D_2$ (e.g., as is shown with respect to the metal nanoparticles 519 shown in FIG. 7). However, with regard to a display that emits unpolarized light, if the alignment direction $D_A$ in which the pattern of the carbon nanoparticles 17 is oriented is approximately aligned with the polarization direction $D_3$, the carbon nanoparticles 17 will be less transparent to the polarization component $D_3$ of the unpolarized light than would be the case with the embodiment of FIG. 6. Moreover, the embodiment of FIG. 6 provides a lesser contact resistance for the same number of carbon nanoparticles 17 than would be the case if the alignment direction $D_A$ in which the pattern of the carbon nanoparticles 17 is oriented is approximately aligned with a polarization direction $D_3$ that is parallel with the surface 14 of the insulating layer 12.

Figure 7:
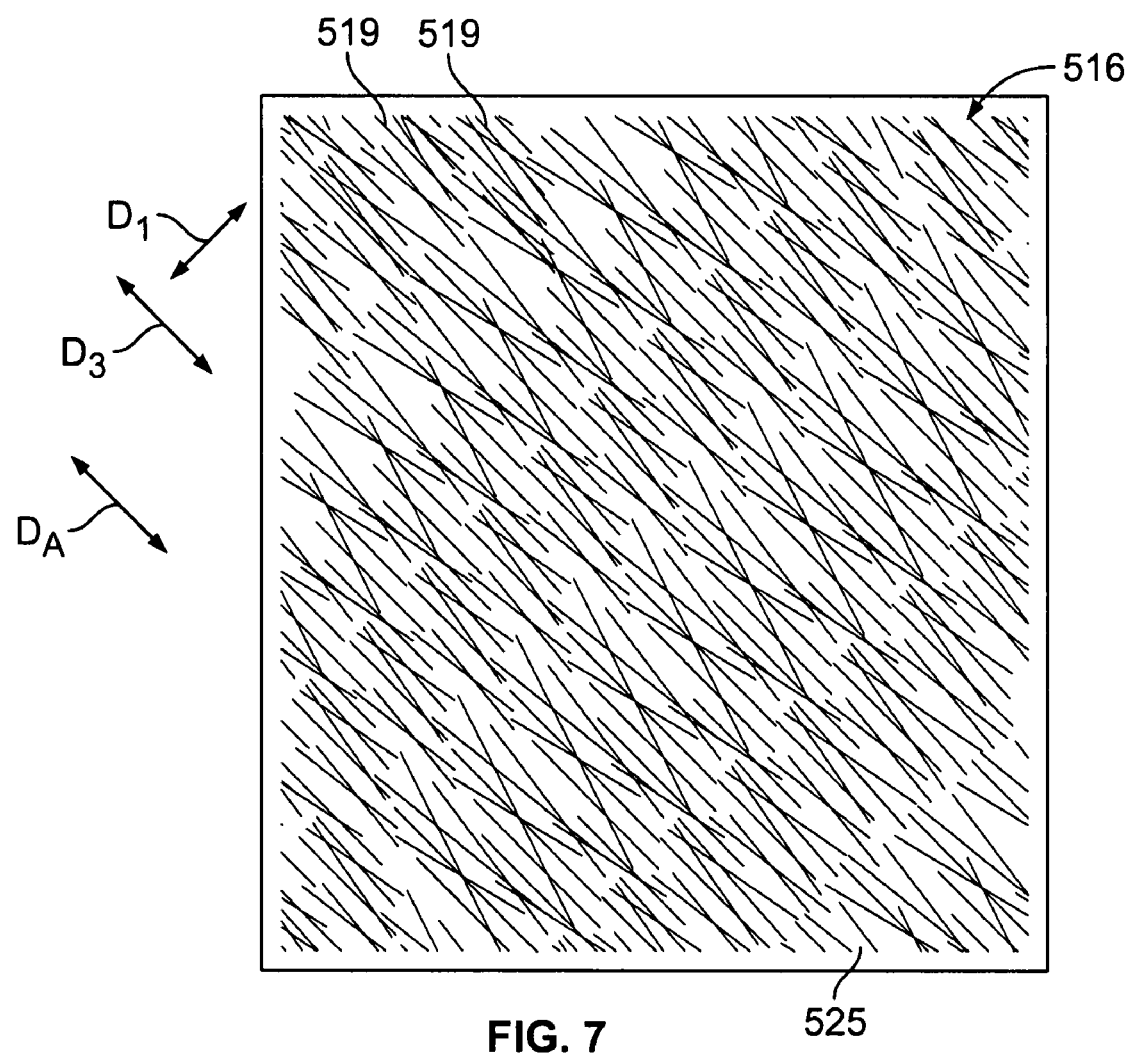
FIG. 7 is a schematic diagram of a touchscreen cover sheet assembly formed in accordance with an alternative embodiment of the present invention.

Some of the carbon nanoparticles 17 lengths $L_1$ may not be oriented approximately in the alignment direction $D_A$. Although the lengths $L_1$ of all of the carbon nanoparticles 17 are shown in FIG. 6 as being approximately oriented in the alignment direction $D_A$, in some embodiments the lengths $L_1$ of some of the carbon nanoparticles 17 are not oriented approximately in the alignment direction $D_A$, but rather are oriented oblique to the direction $D_A$. For example, and as shown in FIG. 7, the lengths of some of a plurality of metal nanoparticles 519 are not oriented approximately in the alignment direction $D_A$, but rather are oriented oblique to the direction $D_A$. However, the distribution of the orientations of the metal nanoparticles 519 is such that the pattern of the metal nanoparticles 519 has an average overall approximate orientation in the alignment direction $D_A$. Specifically, the number of metal nanoparticles 519 that have lengths that are oriented approximately in the direction $D_A$, and the angle of each of the metal nanoparticles 519 that are angled obliquely to the direction $D_A$, is sufficient to provide a predetermined transparency of an electrically conductive layer 525 that includes the metal nanoparticles 519 and/or an electrically conductive material 516 (that includes the layer 525) overall to the polarized light emitted by the display. Moreover, in order for the metal nanoparticles 519 to form a conductive network within the electrically conductive material 516, the metal nanoparticles 519 need to be electrically interconnected. Accordingly, the metal nanoparticles 519 may deviate from being substantially straight along their length, the metal nanoparticles 519 may overlap each other (as shown in FIG. 7), and/or the metal nanoparticles 519 may be at least partially suspended and/or contained within a matrix material (such as, but not limited to, an electrically conductive polymer) that has a sufficient electrical conductivity to electrically interconnect the metal nanoparticles 519. Other examples of embodiments, besides the embodiment of FIG. 6, wherein the lengths of each of a plurality of metal nanoparticles may be approximately oriented in the alignment direction $D_A$ include, but are not limited to, embodiments wherein a template (described below) is used to arrange the metal nanoparticles in the desired orientation. All of the description in this paragraph is also relevant and applicable to the carbon nanoparticles 17, as well as any other carbon nanoparticles and metal nanoparticles described herein.

As shown in FIGS. 4 and 6, the thickness $T_1$ of the carbon nanoparticles 17 may be selected such that the movement of the electrons caused by the electric field of the light emitted by the display (which may or may not be polarized) is small enough to provide the predetermined transparency of the layer 27 and/or the electrically conductive material 16 overall to the light emitted by the display. Any suitable value of the thickness $T_1$ of the carbon nanoparticles 17 that provides the predetermined transparency to the light emitted by the display may be selected, such as, but not limited to, between about molecular dimensions and about hundreds of nanometers in a range that is smaller than the wavelength of the light emitted by the display. Similarly, in other embodiments wherein the electric field of the light emitted by the display excites electrons to move within the carbon nanoparticles 17 along their width $W_1$, the widths $W_1$ of the carbon nanoparticles 17 may be selected as described above in this paragraph with respect to the thicknesses $T_1$.

Although the direction $D_1$ of the electric field of the polarized light emitted by the display is shown in FIG. 6 as being approximately vertical, the direction $D_1$ is not limited to approximately vertical (as seen in FIG. 6). Rather, the light emitted by the display may be polarized in any direction $D_1$ (and the alignment direction $D_A$ may be selected as any direction relative to the direction $D_1$ that provides the predetermined transparency). For example, the direction $D_1$ may alternatively be approximately horizontal. The direction $D_1$ may also be other directions other than approximately horizontal and approximately vertical. For example, FIG. 7 illustrates an embodiment wherein the polarization direction $D_1$ of light emitted by the display extends approximately 45° to horizontal and vertical. As described above, the embodiment of FIG. 6 includes arranging the plurality of carbon nanoparticles 17 in a pattern that is oriented with respect to the polarization direction $D_1$ of the light emitted by the display to provide a predetermined transparency to the light emitted by the display. Additionally or alternatively, and as briefly described above, the metal nanoparticles 19 may be arranged in a pattern that is oriented with respect to the polarization direction $D_1$ of the light emitted by the display to provide the layer 25 and/or the electrically conductive material 16 overall with the predetermined transparency to the light emitted by the display in a manner that is substantially similar to that described herein with respect to the carbon nanotubes 17. For example, in the exemplary embodiment of FIG. 7, the alignment direction $D_A$ of a pattern of the plurality of metal nanoparticles 519 within the layer 525 of the electrically conductive material 516 is approximately perpendicular to the direction $D_1$ of the polarized light emitted by the display. Moreover, the alignment direction $D_A$ of the pattern of the metal nanoparticles 519 is approximately aligned with the direction $D_3$ of another, non-display, polarization of light that is polarized perpendicular to the direction $D_1$. In the exemplary embodiment of FIG. 7, a plurality of carbon nanoparticles (not shown) contained within a layer (not shown) of the electrically conductive material 516 are each randomly oriented within the layer the carbon nanoparticles are contained within.

In addition to providing the predetermined transparency to the polarized light emitted by the display, the exemplary orientation of the pattern of the metal nanoparticles 519 shown in FIG. 7 may facilitate absorbing ambient light reflections. Specifically, the portion of ambient light that is polarized in the direction $D_3$ will excite electrons to move along the length of the metal nanoparticles 519. The larger movement of the electrons along the length of the metal nanoparticles 519, as compared with movement along the thickness or width, will cause the metal nanoparticles 519 to scatter or absorb the ambient light that is polarized in the direction $D_3$. Accordingly, the electrically conductive material 516 may facilitate blocking a portion of ambient light from traveling through the electrically conductive material 516. As such, the electrically conductive material 516 can be used, for example, as a "neutral density filter" that facilitates increasing a contrast ratio of the display by suppressing ambient light reflected from a surface of the display. In addition or alternatively, the metal nanoparticles 519, any other metal nanoparticles described herein, and/or any carbon nanoparticles described herein may be oriented similarly to the metal nanoparticles 519 to provide a neutral density filter. To realize such a neutral density filter benefit, it may be preferred that the nanoparticles interact with light primarily via absorption rather than reflection or scattering. In some embodiments, carbon nanoparticles may provide more absorption than metal nanoparticles.

The electrically conductive material 516 and the metal nanoparticles 519 (excepting the orientation of the metal nanoparticles 519) are substantially similar to the electrically conductive material 16 (FIGS. 1, 2, and 6) and the metal nanoparticles 19 (FIG. 5), respectively. Accordingly, the description and illustration of the electrically conductive material 16 and the metal nanoparticles 19 is applicable to the electrically conductive material 516 and the metal nanoparticles 519. For example, the configuration, material construction, structure thickness, electrical properties, mechanical properties, advantages, application methods and/or means, and the like of the electrically conductive material 516, as well as the advantages, configuration, arrangement, structure, material construction orientation, size, shape, and the like of the metal nanoparticles 519 are substantially similar to that of the electrically conductive material 16 and the metal nanoparticles 19, respectively. Accordingly, the electrically conductive material 516 and the metal nanoparticles 519 will not be described in further detail herein.

Figure 8:
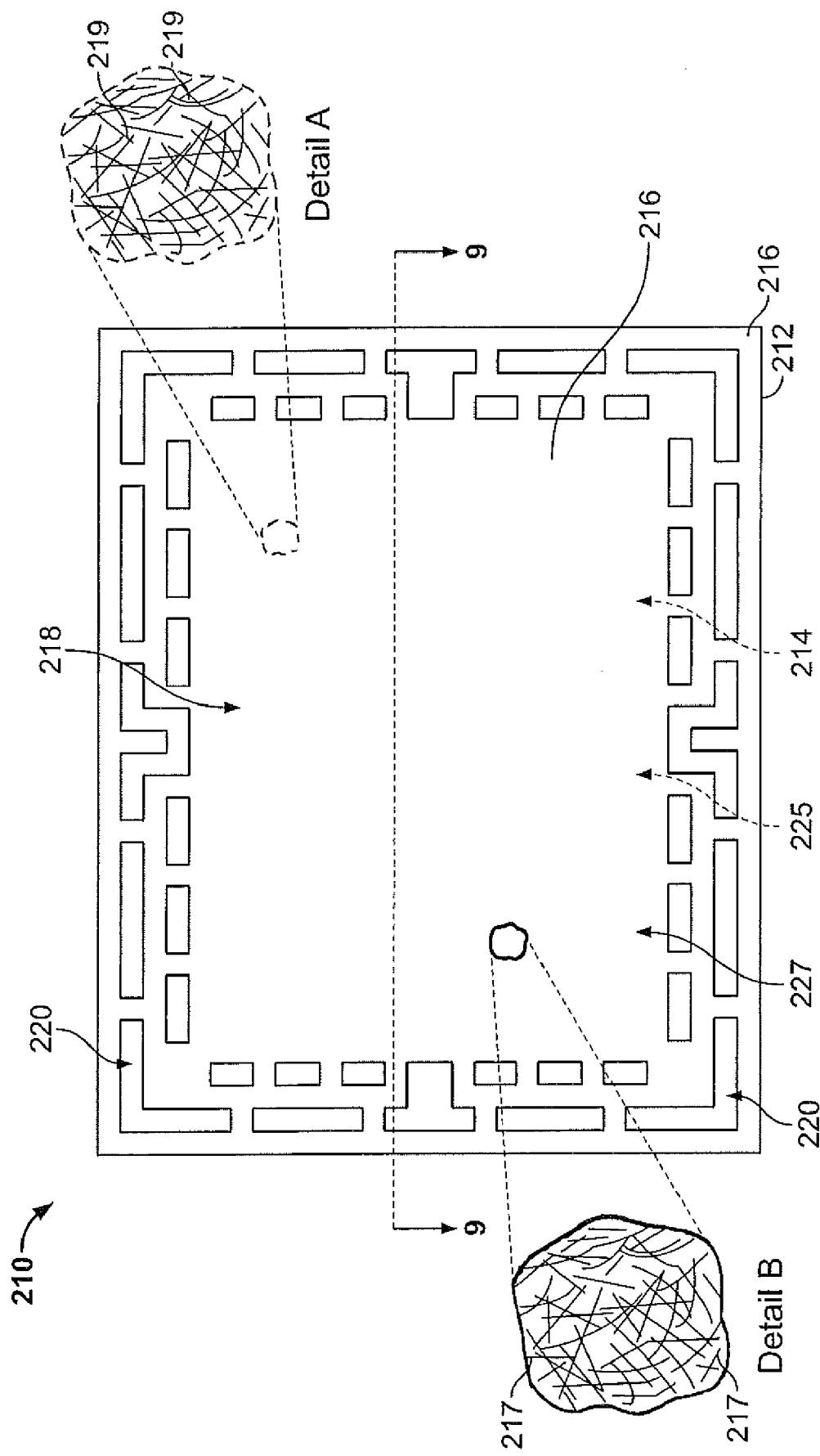
FIG. 8 is a top plan view of a touchscreen substrate assembly formed in accordance with an embodiment of the present invention.
Figure 9:
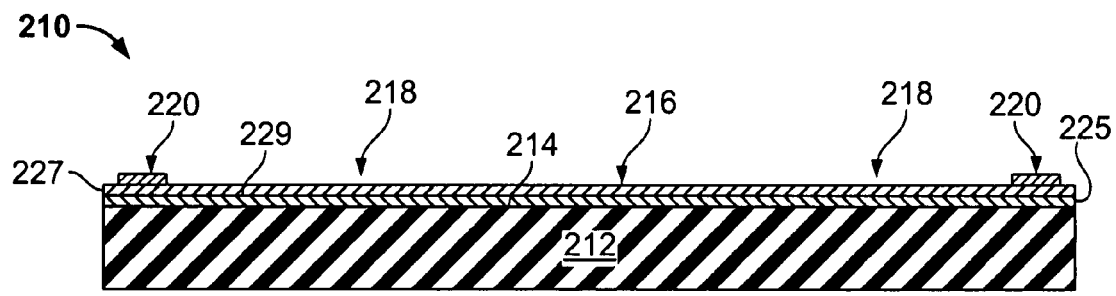
FIG. 9 is a cross-sectional view of the touchscreen substrate assembly taken along line 9-9 of FIG. 8.

FIG. 8 is a top plan view of a touchscreen substrate assembly 210 formed in accordance with an embodiment of the present invention. FIG. 9 is a cross-sectional view of the assembly 210 taken along line 9-9 of FIG. 8. The assembly 210 may be used with any suitable touchscreen system, for example, resistive or capacitive touchscreen systems (not shown in FIGS. 8 and 9). Exemplary touchscreen systems incorporating the assembly 210 will be described in more detail below. The assembly 210 includes a substrate 212 having a surface 214 at least partially coated with an electrically conductive material 216. The electrically conductive material 216 coating the surface 214 provides an electrically conductive touch area 218 on the surface 214. The assembly 210 includes a network of resistors, formed by a pattern of electrically conductive electrodes 220, on the electrically conductive material 216 that border the touch area 218.

In the exemplary embodiment of FIGS. 8 and 9, the electrically conductive material 216 includes two layers 225 and 227. The layer 225 is disposed directly on the surface 214 of the substrate 212 and includes a plurality of metal nanoparticles 219 (shown in detail A of FIG. 8), while the layer 227 is disposed directly on a surface 229 of the layer 225 and includes a plurality of carbon nanoparticles 217 (shown in detail B of FIG. 8). For clarity, the size of the metal nanoparticles 219 and the carbon nanoparticles 217 is exaggerated and the number of metal nanoparticles 219 and carbon nanoparticles 217 is reduced such that a density of the patterns of the metal nanoparticles 219 and the carbon nanoparticles 217 is also reduced. In the exemplary embodiment of FIG. 8, the metal nanoparticles 219 and the carbon nanoparticles 217 are each randomly oriented within the respective layer 225 and 227. Alternatively, the metal nanoparticles 219 and/or the carbon nanoparticles 217 may be arranged in a pattern that is oriented with respect to the direction of the electric field of the light emitted by a display (not shown) with which the assembly 210 is used to provide a predetermined transparency of the layer 225, the layer 227, and/or the electrically conductive material 216 overall to the light emitted by the display. Although two layers 225 and 227 are shown, the electrically conductive material 216 may include any number of layers, each of which may include either the carbon nanoparticles 217 or the metal nanoparticles 219. In addition or alternatively to the layers 225 and/or 227, the electrically conductive material 216 may optionally include one or more layers that each has a mixture of the carbon nanoparticles 217 and the metal nanoparticles 219.

Except for the orientation pattern of the carbon nanoparticles 17, the electrically conductive material 216, the carbon nanoparticles 217, and the metal nanoparticles 219 are substantially similar to the electrically conductive material 16 (FIGS. 1, 2, and 6), the carbon nanoparticles 17 (FIGS. 4 and 6), and the metal nanoparticles 19 (FIG. 5), respectively. Accordingly, the description and illustration of the electrically conductive material 16, the carbon nanoparticles 17, and the metal nanoparticles 19 is applicable to the electrically conductive material 216, the carbon nanoparticles of the material 216, and the metal nanoparticles 219, respectively. For example, the configuration, material construction, structure thickness, electrical properties, mechanical properties, advantages, application methods and/or means, and the like of the electrically conductive material 216, as well as the advantages, configuration, arrangement, structure, material construction orientation, size, shape, and the like of the carbon nanoparticles of the material 216 and the metal nanoparticles 219 is substantially similar to that of the electrically conductive material 16, the carbon nanoparticles 17, and the metal nanoparticles 19, respectively. Accordingly, the electrically conductive material 216, the carbon nanoparticles of the material 216, and the metal nanoparticles 219 will not be described in further detail herein. However, it may be noted that unlike the electrically conductive material 16, the electrically conductive material 216 is not flexed when the touched by a user and accordingly the electrically conductive material 216 may, in some embodiments, be fabricated with a more brittle construction.

The anisotropic properties of the carbon nanoparticles 217 and/or the metal nanoparticles 219 may have an effect on the operation of a touchscreen system that includes the assembly 210. For example, the anisotropic properties of the carbon nanoparticles 217 and/or the metal nanoparticles 219 may cause errors or changes in coordinate measurements of the touch area 218 when touched by a user. Such errors or changes may need to be corrected for, for example using correction coefficients determined during calibration of the touchscreen system.

In the exemplary embodiment, the electrodes 220 are disposed directly on the electrically conductive material 216. Alternatively, the electrodes 220 are disposed directly on the substrate surface 214 underneath the electrically conductive material 216. The pattern of the electrodes 220 is meant as exemplary only and therefore the electrodes 220 are not limited to the pattern shown in FIG. 8. Rather, the electrodes 220 may have any suitable pattern that enables the touchscreen substrate assembly 210 to function as described herein. Similarly, the electrodes 220 may have any suitable size, shape, resistance, electrical conductivity, and/or be fabricated from any suitable material(s) (such as, but not limited to, silver frit and/or the material of the electrically conductive material 216 with a higher density of the carbon nanoparticles and/or the metal nanoparticles), which may depend, for example, on the particular application(s) of the assembly 210 and/or the type of touchscreen system(s) the assembly 210 is used with. Depending, for example, on the particular application(s) of the assembly 210 and/or the type of touchscreen system(s) the assembly 210 is used with, the electrodes 220 may be completely transparent, partially transparent, or opaque. In the assembly 210, certain regions of the electrically conductive material 216 may be removed to form deletion lines (not shown) that are sometimes included in combination with conductive electrodes 220 in designs of known touchscreen substrates.

The substrate 212 may be fabricated from any suitable material(s) that enables the substrate 212 to function as described herein, such as, but not limited to, glass, ceramic, and/or plastic. Depending, for example, on the particular application(s) of the assembly 210 and/or the type of touchscreen system(s) the assembly 210 is used with, the substrate 212 may be completely transparent or partially transparent. The substrate 212 may have any suitable size and/or shape, such as, but not limited to, rectangular, circular, triangular, and/or oval-shaped, that enables the insulating layer 212 to function as described herein, for example, depending on the particular application(s) of the assembly 210 and/or the type and/or configuration of touchscreen system(s) the assembly 210 is used with.

The touch area 218 may have any suitable size and/or shape, such as, but not limited to rectangular, circular, triangular, and/or oval-shaped, that enables the touch area 218 to function as described herein, for example, depending on the particular application(s) of the assembly 210 and/or the type of touchscreen system(s) the assembly 210 is used with. In the exemplary embodiments, the touch area 218 has a generally rectangular shape and covers the area of the substrate surface 214 that is framed by the electrodes 220.

Figure 10:
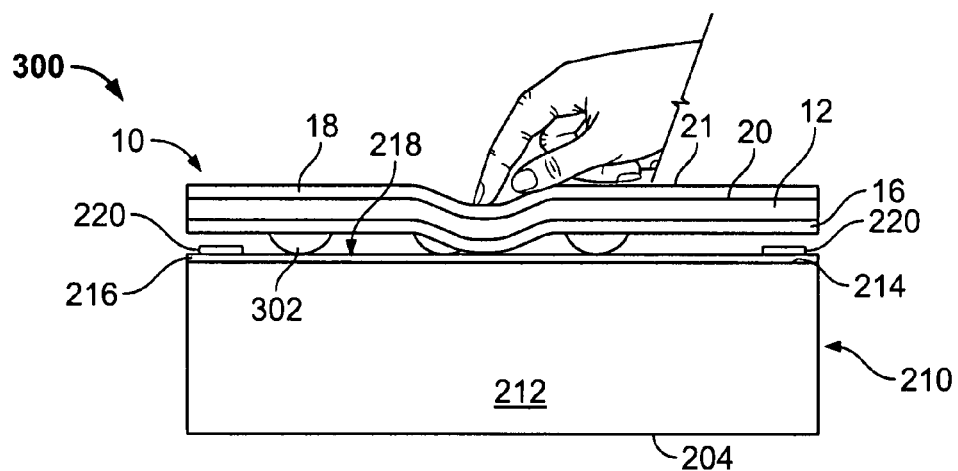
FIG. 10 is a cross-sectional view of a resistive touchscreen system formed in accordance with an embodiment of the present invention.

FIG. 10 is a cross-sectional view of a resistive touchscreen system 300 that may include the touchscreen substrate assembly embodiments and/or the cover sheet assembly embodiments described and/or illustrated herein. In some embodiments, the resistive touchscreen system 300 is a four-wire system. Alternatively, the system 300 may be a five-wire system. The system 300 may be mounted on any suitable display (not shown), such as, but not limited to, a plasma display, a CRT display, an OLED, an LCD and/or any other type of display suitable for use with a touchscreen system. In the exemplary embodiment, the system 300 includes both the cover sheet assembly 10 and the substrate assembly 210, which as discussed above includes the substrate 212, the electrically conductive material 216, the electrically conductive material 16, and the insulating layer 12. Alternatively, the system 300 includes either the assembly 10 or the assembly 210. In such embodiments wherein the system 300 only includes one of the assembly 10 or 210, the assembly that is not included is replaced by a similar assembly (not shown) that includes a known conventional electrically conductive coating.

The cover sheet assembly 10 is spaced from the substrate assembly 210 by a plurality of insulated dots 302. Specifically, the insulated dots 302 space the electrically conductive material 16 on the insulating layer 12 from the electrically conductive material 216 of the substrate assembly 210. A surface 204 of the substrate 212 opposite the surface 214 is typically placed over a face (not shown) of the display with which the touchscreen is being used. In 5-wire resistive touchscreen operation, a processor (not shown) electrically connected to the touch area 218 alternates a voltage across the touch area 218 in the X and Y directions. In 4-wire resistive touchscreen operation, a voltage gradient in the X direction on one of the materials 16 or 216 is alternated with a voltage gradient in the Y direction on the other of the materials 16 and 216. When a user makes an input by touching the touch surface (21, or alternatively the surface 20 when the coating 18 is not included) of the insulating layer 12 at a location within the touch area 218, the touch causes the insulating layer 12 to move toward the substrate 212. Movement of the insulating layer 12 towards the substrate 212 causes the electrically conductive material 16 on the insulating layer 12 to engage, and thereby make electrical contact with, the electrically conductive material 216 of the substrate assembly 210 at the location of the movement, or touch. An electrical circuit (not shown) connected to the processor digitizes the voltages or equipotentials associated with the touch and transmits the voltages or equipotentials to the processor, or a processor of the computer or other device, for processing the user's input. The finger touch shown in FIG. 10 electrically connects the materials 16 and 216 and in doing so closes a circuit from the processor through electrical interconnections (not shown) to the material 16, through the material 16, through the contact resistance between the materials 16 and 216, through the material 216, and through electrical interconnections (not shown) back to the processor. The net electrical resistance of the closed circuit described in this paragraph is referred to at the "closed circuit resistance".

The metal nanoparticles described herein may be fabricated from any suitable metals, such as, but not limited to, silver, bismuth, gold, nickel, tin, copper, zinc, and/or any other electrically conductive metal. Although the metal nanoparticles described herein are shown as being metal nanofibers, the metal nanoparticles described herein may include any suitable shape, properties, structure, and/or the like that enables the metal nanoparticles to function as described herein, such as, but not limited to, metal nanofibers, metal nanospheres, metal nanotubes, and/or metal nanowires. Although the carbon nanoparticles described herein are shown as being carbon nanotubes, the carbon nanoparticles described herein may include any suitable shape, properties, structure, and/or the like that enables the carbon nanoparticles to function as described herein, such as, but not limited to, carbon nanotubes, carbon nanofibers, carbon nanospheres, and/or carbon nanowires. With regard to carbon nanotubes, the carbon nanotubes may include single-walled carbon nanotubes and/or multi-walled carbon nanotubes. Moreover, the carbon nanotubes may be pristine, functionalized, and/or filled with another material, such as, but not limited to, a metal, to, for example, form "nanowires" encapsulated within carbon nanotube lumens. As used herein, the term "carbon nanotubes" means nanotubes that include carbon, for example a fullerene having a cylindrical configuration.

Each layer of the electrically conductive materials described herein, including any layers in alternative embodiments that include a mixture of both carbon nanoparticles and metal nanoparticles, may be fabricated using any suitable method, structure, process, and/or means that enables the layers to function as described herein. Each layer of the electrically conductive material may include any suitable structure and/or components that enable the layer(s) to function as described herein. Examples of structures including carbon nanoparticles and/or metal nanoparticles that may be suitable for constructing the layer(s) of the electrically conductive materials include, but are not limited to, films and/or fabrics consisting at least partially of a plurality of carbon nanoparticles and/or metal nanoparticles, whether the carbon nanoparticles and/or the metal nanoparticles are randomly arranged or arranged in a desired orientation(s) as described herein. Each layer of the electrically conductive materials may be constructed of a fabric and/or film of carbon nanoparticles and/or metal nanoparticles that is a monolayer of carbon nanoparticles and/or metal nanoparticles, or may optionally be constructed from a plurality of layers of carbon nanoparticles and/or metal nanoparticles. The carbon nanoparticles and/or metal nanoparticles of the layer(s) of the electrically conductive materials may optionally be suspended and/or contained in a matrix of one or more other suitable materials that enable the electrically conductive material to function as described herein, such as, but not limited to, polymers. Examples of suitable polymers for the matrix include, but are not limited to, polymethyl methacrylate (PMMA), polyacrylates, polyacrylonitriles, polyvinyl alcohols, polyesters, polycarbonate, polyurethane, polyvinyl chloride and/or any other polymer soluble in a solvent. Examples of suitable solvents include, but are not limited to toluene, xylene, methyl ethyl ketone (MEK), and/or the like. In some embodiments wherein the electrically conductive material includes separate layers of carbon nanoparticles and metal nanoparticles, the carbon nanoparticles may be functionalized to facilitate adhesion between adjacent separate layers of carbon nanoparticles and metal nanoparticles, such as, but not limited to, using a carboxylic group grafted to the carbon nanoparticles, using a disulfide group grafted to the carbon nanoparticles, using a thiophene group grafted to the carbon nanoparticles, and/or using planar conjugated hydrocarbons such as, but not limited to, pyrenes.

Each layer of the electrically conductive materials described herein, including any layers in alternative embodiments that include a mixture of both carbon nanoparticles and metal nanoparticles, may be grown or deposited, when applicable, directly on a surface (e.g., the insulating layer surface 14 or a corresponding surface of another layer of the electrically conductive material). Alternatively, one or more layer(s) of the electrically conductive materials may be pre-fabricated and deposited on the surface. Each layer of the electrically conductive materials may be applied on the surface using any suitable method, process, structure, and/or means that enables the electrically conductive material to function as described herein, such as, but not limited to, spin coating, dipping, spraying (such as, but not limited to, aerosol application), screen printing operations, and/or growth directly on the surface (such as, but not limited to, spin-coated catalyst-based growth and/or gas-phase catalyst-assisted chemical vapor deposition (CVD)). In some deposition processes, such as, but not limited to, spin coating, spraying, dipping, and/or screen printing processes, the carbon nanoparticles and/or the metal nanoparticles may be suspended and/or contained in a suitable solvent in a soluble or insoluble form. Parameters for controlling such exemplary types of application to the surface or the corresponding layer surface include surface functionalization of the underlying surface, spin-coating parameters (such as, but not limited to, length, suspension concentration, spin coating solution concentration, and/or revolutions per minute (RPM)), the number of applications, temperature, pH, time, catalyst density/concentration, and/or growth environment (such as, but not limited to, growth time, growth temperature, and/or gas concentration). Carbon nanoparticles may optionally be functionalized (such as, but not limited to, using a carboxylic group grafted to the carbon nanoparticles, using a disulfide group grafted to the carbon nanoparticles, using a thiophene group grafted to the carbon nanoparticles, and/or using planar conjugated hydrocarbons such as, but not limited to, pyrenes) to aid in enhancing the internal adhesion between carbon nanoparticles and/or between carbon nanoparticles and metal nanoparticles. Directed growth and/or chemical self-assembly of carbon nanoparticles may be used to grow or deposit the individual nanotubes with suitably controlled orientation, length, and the like. For example, during some of the applications discussed herein, carbon nanoparticles may exhibit a "self-assembly" trait where individual nanotubes tend to adhere to a surface to which they are applied whenever energetically favorable. Individual carbon nanoparticles may adhere to each other as a consequence of van der Waals forces, depending, for example, on the particular application(s) of the assembly and/or the type of touch-screen system(s) the assembly is used with.

The carbon nanoparticles and/or the metal nanoparticles may be arranged into the desired orientation pattern using any suitable method, process, structure, and/or means, such as, but not limited to, using fluid flow alignment, screen printing, electrical field effects, a template that includes grooves sized and shaped to at least partially receive the carbon nanoparticles and/or metal nanoparticles, and/or tendencies for self-alignment. Another example includes initially forming a randomly ordered network of the carbon nanoparticles and/or the metal nanoparticles and then removing and/or destroying carbon nanoparticles and/or metal nanoparticles having an undesired orientation, such as, but not limited to, using polarized infrared and/or radio frequency (RF) heating. Still another example includes forming, such as, but not limited to, growing and/or depositing, the carbon nanoparticles and/or the metal nanoparticles in the desired orientation pattern and securing the position of each of the carbon nanoparticles and/or the metal nanoparticles by suspending and/or containing at least a portion of the carbon nanoparticles and/or the metal nanoparticles within a matrix, such as, but not limited to, the polymer matrices described above.

Each layer of the electrically conductive materials described herein, including any layers in alternative embodiments that include a mixture of both carbon nanoparticles and metal nanoparticles, may have any suitable thickness that enables the layer(s) and/or the electrically conductive material 16 overall to function as described herein. The electrically conductive material 16 overall may optionally have a uniform thickness to provide consistent electrical properties, such as, but not limited to resistance. The thickness of any layers that include carbon nanoparticles may, in some embodiments, be defined by a length of the carbon nanoparticles (for example, thickness of the layer 27). In other embodiments, the thickness of any layers that include carbon nanoparticles may be defined by a width, thickness, and/or diameter of the carbon nanoparticles when the layer includes only one layer of the carbon nanoparticles, or may be defined by a multiple of the width, thickness, and/or diameter of the carbon nanoparticles when the layer includes more than one layer of the carbon nanoparticles. The material(s) and/or thickness, for example, of the electrically conductive material overall may be selected to provide any suitable contact and/or sheet resistance that enables the electrically conductive material to function as described herein and/or that enables the electrically conductive material to provide a desired closed circuit resistance, such as, but not limited to, a sheet resistance of less than about 2000 Ohms/square, a contact resistance of less than about 2000 Ohms, and/or a closed circuit resistance of less than about 3000 Ohms. The selected sheet, closed circuit, and/or contact resistance may depend, for example, on the particular application(s) of the assembly and/or the type of touchscreen system(s) the assembly is used with. In some embodiments, in order to minimize optical absorption by carbon nanoparticles, it may be desirable to make the electrically conductive material overall and/or any layers that include carbon nanoparticles as thin as possible while still facilitating protecting and sealing the material overall and/or the layer(s) from corrosive elements.

As an alternative to the carbon nanoparticles, the electrically conductive materials described herein may include an electrically conductive polymer, whether the electrically conductive polymer be in a layer that is separate from the metal nanoparticles or whether the electrically conductive material include a layer having a mixture of the metal nanoparticles and the electrically conductive polymer. In embodiments wherein the electrically conductive material includes an electrically conductive polymer, linear paths of molecular chains of atoms of the electrically conductive polymer along which electrons move provide the functionality of the carbon nanoparticles that is described herein. Examples of suitable electrically conductive polymers include, but are not limited to, thiophene derivative polymers and/or polythiophene derivative polymers.

Example

As described above, each layer of the electrically conductive materials described and illustrated herein may be fabricated using any suitable method, structure, process, and/or means that enables the layers to function as described herein. One example of fabricating the layers 25 and 27 (FIG. 2) includes, but is not limited to:

(1) generating the layer 27 by growing the carbon nanoparticles 17 in the pattern of the carbon nanoparticles 17 illustrated in FIG. 6 onto a quartz substrate by pyrolyzing iron (II) phthalocyanine (FePc) under an argon/hydrogen atmosphere at between approximately 800 and 1100° C. (see Yang, Y.; Huang, S.; He, H.; Mau, A. W. H.; Dai, L. *J. Am. Chem. Soc.* 1999, 121, 10832; and Dai, L.; Patil, A.; Gong, X.; Guo, Z.; Liu, L.; Liu, Y.; Zhu, D. *Chem. Phys. Chem.* 2003, 4, 1150, and references cited therein);

(2) functionalizing the carbon nanoparticles 17 by grafting a carboxylic group to the walls of the carbon nanoparticles 17 using polyacrylic acid;

(3) generating a metal nanofiber seed layer by reacting the carbon nanoparticles 17 with 0.25 mM $AgNO_3$ and 0.25 mM trisodium citrate, followed by adding 0.6 mL of 10 mM $NaBH_4$ and stirring for 30 seconds;

(4) generating the layer 25 on the layer 27 by:
(a) preparing a solution of 2.5 mL of 10 mM $AgNO_3$, 5.0 mL of 100 mM ascorbic acid, and 93 mL of 80 mM cetyl trimethel ammonium bromide (CTAB);
(b) adding 2.5 mL of the metal nanofiber seed layer to the solution;
(c) adding 0.5 mL of 1 M NaOH to the solution;
(d) mixing the solution;
(e) centrifuging 10 mL of the solution at 6000 rpm for 30 minutes;
(f) removing the supernatant; and
(g) redispersing the precipitate, containing silver nanofibers, in 0.5 ml of deionized water;
(see Jana, N.; Gearheart, L.; Murphy, C.; *Chem. Commun.*, 2001, 617-618);

(5) suspending the adhered layers 25 and 27 in a matrix by drawing a solution of PMMA in toluene at a concentration of 2 wt % down through the layer 25 and into the layer 27 until about half a length of the carbon nanoparticles 17 are coated, followed by air drying and baking at 80° C. overnight to generate the electrically conductive material 16;

(6) peeling the electrically material 16 off the quartz substrate; and (7) applying the electrically conductive material 16 to the insulating layer surface 14 such that the layer 25 is sandwiched between the insulating layer surface 14 and the layer 27 and such that the non-coated ends of the carbon nanotubes 17 are exposed and protrude outwardly from the PMMA matrix.

It is noted that the coating depth of a particular polymer (PMMA in this example) relative to the carbon nanoparticles 17 may be controlled, but is not limited to being controlled, by regulating the nature of solvent, polymer concentration, volume of the polymer solution, nanotube packing density, and/or plasma modification of nanotube surfaces.

The embodiments described and/or illustrated herein provide touchscreens having electrically conductive materials that may have an increased durability as compared with electrically conductive materials formed from ITO. The embodiments described and/or illustrated herein may provide electrically conductive materials that include metal nanofibers with an improved corrosion resistance. The embodiments described and/or illustrated herein may provide electrically conductive materials that include carbon nanotubes with an improved transparency.

Although the electrically conductive material embodiments described and/or illustrated herein and described and/or illustrated herein with respect to resistive touchscreen systems, the electrically conductive material embodiments described and/or illustrated herein are not limited for use with resistive touchscreen systems, but rather may be used with any other type of touchscreen system, such as, but not limited to, capacitive touchscreen systems. Although the electrically conductive material embodiments described and/or illustrated are described and/or illustrated herein with respect to touchscreen systems, the electrically conductive material embodiments described and/or illustrated herein are not limited for use with touchscreen systems, but rather may be used with any suitable system and/or for any application that includes an at least partially transparent electrically conductive material.

Exemplary embodiments are described and/or illustrated herein in detail. The embodiments are not limited to the specific embodiments described herein, but rather, components and/or steps of each embodiment may be utilized independently and separately from other components and/or steps described herein. Each component, and/or each step of one embodiment, can also be used in combination with other components and/or steps of other embodiments. When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc. Moreover, the terms "first," "second," and "third," etc. in the claims are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

While the invention has been described in terms of various specific embodiments, those skilled in the art will recognize that the invention can be practiced with modification within the spirit and scope of the claims.

What is claimed is:

1. A cover sheet assembly for a touchscreen system, said cover sheet assembly comprising:
    an insulating layer having a surface configured to be disposed over an electrically conductive area of a substrate of the touchscreen system; and
    an electrically conductive material disposed on at least a portion of the surface of the insulating layer, the electrically conductive material comprising a plurality of carbon nanoparticles and a plurality of metal nanoparticles, at least one of the plurality of carbon nanoparticles and the plurality of metal nanoparticles arranged in a pattern that is oriented with respect to a direction of a polarization of light such that at least a portion of the electrically conductive material has a predetermined transparency with respect to the polarization of light.

2. The cover sheet assembly according to claim 1, wherein the electrically conductive material comprises first and second layers, the first layer being disposed directly on the surface of the insulating layer and the second layer being disposed directly on a surface of the first layer, the first layer comprising the plurality of the metal nanoparticles, the second layer comprising the plurality of carbon nanoparticles.

3. The cover sheet assembly according to claim 1, wherein the electrically conductive material comprises a single layer having a mixture of the plurality of carbon nanoparticles and the plurality of metal nanoparticles.

4. The cover sheet assembly according to claim 2, wherein the metal nanoparticles comprise at least one of silver, bismuth, gold, nickel, tin, copper, and zinc nanoparticles.

5. The cover sheet assembly according to claim 3, wherein the plurality of metal nanoparticles and at least a portion of the plurality of carbon nanoparticles are at least partially contained by a polymer matrix.

6. A cover sheet assembly for a touchscreen system, said cover sheet assembly comprising:
    an insulating layer having a surface configured to be disposed over an electrically conductive area of a substrate of the touchscreen system; and
    an electrically conductive material disposed on at least a portion of the surface of the insulating layer, the electrically conductive material comprising a plurality of carbon nanoparticles and a plurality of metal nanoparticles, wherein at least one of the plurality of carbon nanoparticles and the plurality of metal nanoparticles are arranged in a pattern that is oriented in an alignment direction that is more aligned with a first direction than with a polarization direction of a polarization of light, the first direction being approximately perpendicular to the polarization direction of the polarization of light.

7. The cover sheet assembly according to claim 6, wherein the electrically conductive material comprises first and second layers, the first layer being disposed directly on the surface of the insulating layer and the second layer being disposed directly on a surface of the first layer, the first layer comprising the plurality of the metal nanoparticles, the second layer comprising the plurality of carbon nanoparticles.

8. The cover sheet assembly according to claim 6, wherein the electrically conductive material comprises a single layer having a mixture of the plurality of carbon nanoparticles and the plurality of metal nanoparticles.

9. The cover sheet assembly according to claim 6, wherein the pattern of at least one of the plurality of carbon nanoparticles and the plurality of metal nanoparticles is oriented in an alignment direction that is approximately aligned with the first direction.

10. The cover sheet assembly according to claim 6, wherein the first direction is approximately perpendicular to the surface of the insulating layer.

11. The cover sheet assembly according to claim 6, wherein the metal nanoparticles comprise at least one of silver, bismuth, gold, nickel, tin, copper, and zinc nanoparticles.

12. The cover sheet assembly according to claim 6, wherein the plurality of metal nanoparticles and at least a portion of the plurality of carbon nanoparticles are at least partially contained by a polymer matrix.

13. The cover sheet assembly according to claim 6, wherein the plurality of carbon nanoparticles comprise at least one of carbon nanotubes, carbon nanospheres, carbon nanofibers, and carbon nanowires, the plurality of metal nanoparticles comprising at least one of metal nanofibers, metal nanospheres, metal nanotubes, and metal nanowires.

14. A substrate assembly for a touchscreen system, said substrate assembly comprising:
    a substrate; and
    an electrically conductive material disposed on at least a portion of a surface of the substrate to provide an electrically conductive touch area on the substrate, the electrically conductive material comprising a plurality of carbon nanoparticles and a plurality of metal nanoparticles; wherein at least one of the plurality of carbon nanoparticles and the plurality of metal nanoparticles are arranged in a pattern that is oriented in an alignment direction that is more aligned with a first direction than with a polarization direction of a polarization of light, the first direction being approximately perpendicular to the polarization direction of the polarization of light.

15. The substrate assembly according to claim 14, wherein the electrically conductive material comprises first and second layers, the first layer being disposed directly on the substrate surface and the second layer being disposed directly on a surface of the first layer, the first layer comprising the plurality of the metal nanoparticles, the second layer comprising the plurality of carbon nanoparticles.

16. The substrate assembly according to claim 14, wherein the electrically conductive material comprises a single layer having a mixture of the plurality of carbon nanoparticles and the plurality of metal nanoparticles.

17. The substrate assembly according to claim 14, wherein the pattern of at least one of the plurality of carbon nanoparticles and the plurality of metal nanoparticles is oriented in an alignment direction that is approximately aligned with the first direction.

18. The substrate assembly according to claim 14, wherein the first direction is approximately perpendicular to the surface of the substrate.

19. The substrate assembly according to claim 14, further comprising a cover sheet positioned over the touch area on the substrate, the cover sheet comprising an insulating layer and a second electrically conductive material disposed on at least a portion of a surface of the insulating layer that generally faces the substrate.

20. The substrate assembly according to claim 19, wherein the plurality of carbon nanoparticles is a first plurality of carbon nanoparticles, and the plurality of metal nanoparticles is a first plurality of metal nanoparticles, the second electrically conductive material comprising a second plurality of carbon nanoparticles and a second plurality of metal nanoparticles.

* * * * *